Figure 1:
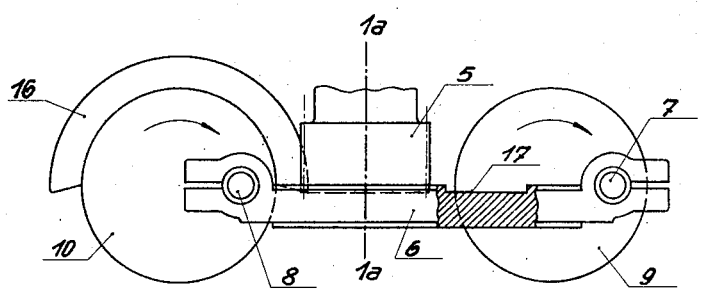
Figure 1A:
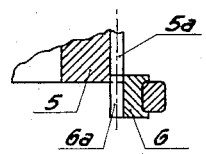

April 12, 1927.  
C. F. RÖBER  
1,623,978

DEVICE FOR INTERMITTENTLY DRIVING CIGARETTE MACHINE SHAFTS

Filed Aug. 14, 1924

Constantin Friedrich Röber by C. P. Gropel his Attorney.

Patented Apr. 12, 1927.

1,623,978

UNITED STATES PATENT OFFICE.

CONSTANTIN FRIEDRICH RÖBER, OF DRESDEN, GERMANY, ASSIGNOR TO "UNIVERSELLE" CIGARETTENMASCHINENFABRIK J. C. MULLER & CO., OF DRESDEN, GERMANY.

DEVICE FOR INTERMITTENTLY DRIVING CIGARETTE-MACHINE SHAFTS.

Application filed August 14, 1924, Serial No. 732,105, and in Germany May 19, 1924.

This invention relates to apparatus for intermittently driving cigarette machine shafts, more particularly the coiling mandrel in cigarette shell or case machines.

The invention is an improvement in or modification of that described in the specification of my prior application for patent Serial No. 726,888, filed July 18, 1924.

The rack of the parallel crank of connecting rod mechanism forming the subject of the said prior application for patent cooperates with the pinion to be driven on the coiling mandrel shaft in such manner that the rack, on reaching the one dead centre, meshes with the teeth of the pinion, remains in mesh with such teeth until the other dead centre position of the crank and connecting rod mechanism is reached, and then moves out of mesh with the pinion.

The present application relates to locking mechanism by which during the period that the rack is out of engagement with the pinion, the pinion is locked by means of a locking tooth which is driven by the crank and connecting rod mechanism.

This locking tooth is provided on the one crank disc and on disengagement of the rack gradually moves into the teeth of the pinion. If the locking tooth only engages the pinion when the dead centre position has been reached and the pinion released it may not hold the pinion sufficiently firmly, and experience has shown that shocks occur in the gearing which is driven in accordance with the invention with great rapidity. The rack is therefore so arranged that it remains in engagement with the pinion even when the dead centre position, suited in accordance with the said prior invention for the disengagement of the rack, has been reached. The rack is maintained in engagement until the locking tooth has with certainty reached the locking position, so that the pinion will be held firmly on the coiling mandrel shaft.

Vice versa, the locking tooth holds the pinion firmly until the last moment, so that the pinion is actually held with complete certainty in locking position until the rack has reached the second dead centre position of the mechanism, which is convenient for the re-engagement of the rack with the pinion to be driven. In this position a premature engagement of the rack, no matter how slight, would result in rotation of the pinion, which, however, since it is still locked, is impossible. Consequently the rack, in accordance with the invention, is provided with a recess which in the second dead centre position of the mechanism comes opposite the pinion, in such manner that the teeth of the rack engage the teeth of the pinion exactly at the moment when the dead centre has been reached, and the locking tooth is moved out of engagement with the pinion.

Figure 2:
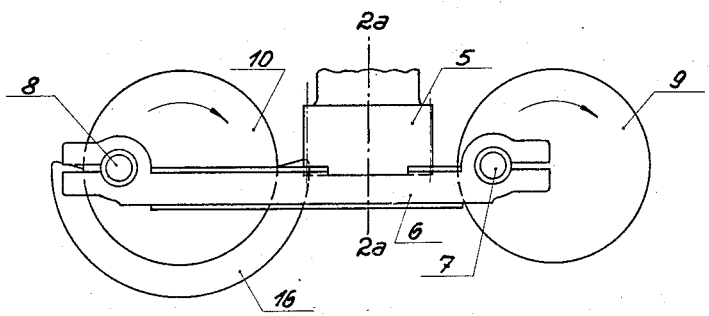
Figure 2A:
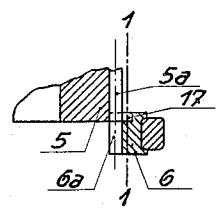

Figs. 1 and 2 of the accompanying drawing show the two positions of the parallel crank and connecting rod mechanism in plan, while Figs. 1ª and 2ª are vertical sections on the lines 1ª—1ª and 2ª—2ª of Figs. 1 and 2 respectively.

As shown, the rack 6 is carried by means of the crank pins 7, 8, of the crank discs 9, 10. On the crank disc 10 is provided an approximately semi-circular locking tooth 16, adapted to enter the teeth of the pinion 5 to be driven. In Fig. 1 the rack 6 is shown in that position at which it becomes disengaged from the pinion 5 (crank discs 9, 10, rotated in the direction of the arrows). The crank discs having reached the dead centre position for such disengagement, the locking tooth 16 commences to enter the teeth of the pinion 5.

The rack 6 is so formed that in this position it has not yet disengaged the pinion 5. It is set in relation to the dead centre position in such manner that it still remains in mesh with the pinion 5 a short time in mesh with the pinion 5. During this short time the locking tooth 16 completely engages the pinion 5, and thus a proper locking action of the pinion is obtained.

From Figs. 1 and 1ª it is clear how the teeth 6ª of the rack 6 are still in mesh with teeth 5ª of the pinion 5, when the locking tooth 16 is already in engagement with the pinion 5. On further rotation of the mechanism the rack 6 moves out of engagement with the teeth of the pinion 5, as soon as the locking tooth 16 has moved into complete engagement with the teeth of the pinion 5.

When the rack 6, on reaching the other dead centre position of the mechanism (shown in Fig. 2) is to engage the pinion 5 once again, such engagement must only take place when locking tooth 16 has moved out of engagement with the teeth of the pinion 5, which occurs at the moment when the dead centre position of the mechanism is reached.

With the arrangement of the rack 6 just described a premature engagement of its teeth in the pinion 5 would result. In order to prevent such premature engagement the rack 6 adjacent the teeth which engage the pinion 5 is provided with a recessed portion 17, shown clearly in Fig. 1, the corresponding part of the rack being shown in horizontal section on the line 1—1 of Fig. 2ª. This recess 17 is so dimensioned that the rack 6 comes in contact with the pinion 5 exactly at the moment when the dead centre position of the mechanism (shown in Fig. 2) has been reached. At this moment the tooth 16 also moves out of engagement with the teeth of the pinion 5.

Having now particularly described and ascertained the nature of my said invention, and in what manner the same is to be performed, I declare that what I claim is:—

1. In an intermittent motion mechanism, a pinion adapted to be rotated intermittently in one direction, a rack adapted to engage said pinion, means for reciprocating said rack, and for effecting an engagement thereof with the pinion for driving it during the longitudinal movement thereof in one direction, and means carried by the rack operating means for holding the pinion against turning during the movement of the rack in the reversed direction.

2. In an intermittent motion mechanism, a pair of spaced crank disks, a connecting rod therebetween including a rack, means for rotating said disks so as to impart longitudinal and sidewise reciprocations to said connecting rod, a pinion adapted to be engaged to be rotated by said rack during its longitudinal movement in one direction and to be disengaged from the rack by the sidewise movement thereof in one direction and to be engaged again by the sidewise movement in the opposite direction following the return longitudinal reciprocating movement, and means on one of the disks adapted to engage said pinion for locking it against turning during the return longitudinal reciprocating movement of the rack.

3. In an intermittent motion mechanism including a rack, means for imparting longitudinal and sidewise reciprocations to said rack, a pinion positioned so as to be engaged and rotated by said rack during its longitudinal movement in one direction and to be engaged by and disengaged therefrom by the sidewise movement at the beginning and end of said longitudinal movement, and means carried by the rack operating means adapted to engage said pinion and lock it against turning during the time it is disengaged from the rack.

4. In an intermittent motion mechanism, a pinion adapted to be rotated intermittently in one direction, a rack adapted to engage said pinion, means for imparting longitudinal reciprocations to said rack, and imparting sidewise reciprocations to said rack in a plane with the teeth of the pinion, and to cause the rack to disengage the pinion when the rack is practically at a stand still, and means carried by the rack reciprocating means for engaging the pinion and holding the same against rotation during the movement of the rack in the reverse direction.

5. In an intermittent motion mechanism, a pinion adapted to be rotated intermittently in one direction, a pair of spaced rack disks, a connecting rod including a rack, means for rotating said disks for imparting the longitudinal and sidewise reciprocations to said rack, and means carried by one of the disks for engaging the pinion and holding the same against rotation during the movement of the rack in a reverse direction.

6. In an intermittent motion mechanism, a pinion adapted to be rotated intermittently in one direction, a pair of spaced disks, one on each side of the pinion, a connecting rod including a rack connected by wrist pins to the disks, means for rotating the disks so as to impart a longitudinal and sidewise reciprocation to said rack, and an elongated flange carried by one of the disks for engaging the pinion and holding the same against rotation during the movement of the rack in a reverse direction.

7. In an intermittent motion mechanism, a pinion adapted to be rotated intermittently in one direction, a pair of spaced crank disks, one on each side of the pinion, a connecting rod connecting the disks and including a rack, means for rotating said disks so as to impart longitudinal movement to the rack, and a sidewise movement of the rack in a plane with the teeth of the pinion and cause the rack to disengage the pinion when the same is at a stand still, and a circumferential flange carried by one of the disks and adapted to engage the pinion and hold it against rotation during the reversed movement thereof.

In testimony whereof I affix my signature.

CONSTANTIN FRIEDRICH RÖBER.